(12) United States Patent
Holmes

(10) Patent No.: US 9,162,666 B2
(45) Date of Patent: Oct. 20, 2015

(54) HYBRID VEHICLE AND METHOD OF BRAKING BY CONTROLLING AN EXHAUST HEAT RECOVERY DEVICE BYPASS VALVE ON A HYBRID VEHICLE

(71) Applicant: GM GLOBAL TECHNOLOGY OPERATIONS LLC, Detroit, MI (US)

(72) Inventor: Alan G. Holmes, Clarkston, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 203 days.

(21) Appl. No.: 13/838,888

(22) Filed: Mar. 15, 2013

(65) Prior Publication Data

US 2014/0277876 A1    Sep. 18, 2014

(51) Int. Cl.
| | |
|---|---|
| H02P 3/00 | (2006.01) |
| B60K 6/00 | (2007.10) |
| G06F 19/00 | (2011.01) |
| B60W 10/198 | (2012.01) |
| B60W 10/06 | (2006.01) |
| B60W 10/184 | (2012.01) |
| B60W 10/196 | (2012.01) |
| B60W 20/00 | (2006.01) |
| B60W 10/08 | (2006.01) |
| F02D 9/06 | (2006.01) |

(52) U.S. Cl.
CPC ............. *B60W 10/198* (2013.01); *B60W 10/06* (2013.01); *B60W 10/08* (2013.01); *B60W 10/184* (2013.01); *B60W 10/196* (2013.01); *B60W 20/00* (2013.01); *B60W 20/1062* (2013.01); *F02D 9/06* (2013.01); *B60W 2600/00* (2013.01); *B60Y 2400/206* (2013.01); *Y02T 10/6286* (2013.01); *Y10S 903/93* (2013.01)

(58) Field of Classification Search
USPC .......... 701/22, 70, 110, 54, 68; 123/320, 323, 123/330
See application file for complete search history.

(56) References Cited

U.S. PATENT DOCUMENTS

| | | | |
|---|---|---|---|
| 8,116,955 B2 * | 2/2012 | Huseman | 701/54 |
| 8,290,689 B2 * | 10/2012 | Andrasko et al. | 701/112 |
| 2005/0189894 A1 * | 9/2005 | Komiyama et al. | 318/376 |
| 2008/0276916 A1 * | 11/2008 | Sekfane | 123/568.21 |
| 2013/0219861 A1 * | 8/2013 | Webb et al. | 60/274 |

* cited by examiner

*Primary Examiner* — Adam Tissot
(74) *Attorney, Agent, or Firm* — Quinn Law Group, PLLC

(57) ABSTRACT

A method of braking a vehicle includes determining via a controller a desired braking power for braking the vehicle. Under the method, a bypass valve that controls exhaust gas flow through the exhaust heat recovery device is moved via the controller to a relatively restrictive position to provide at least some of the desired braking power.

16 Claims, 2 Drawing Sheets

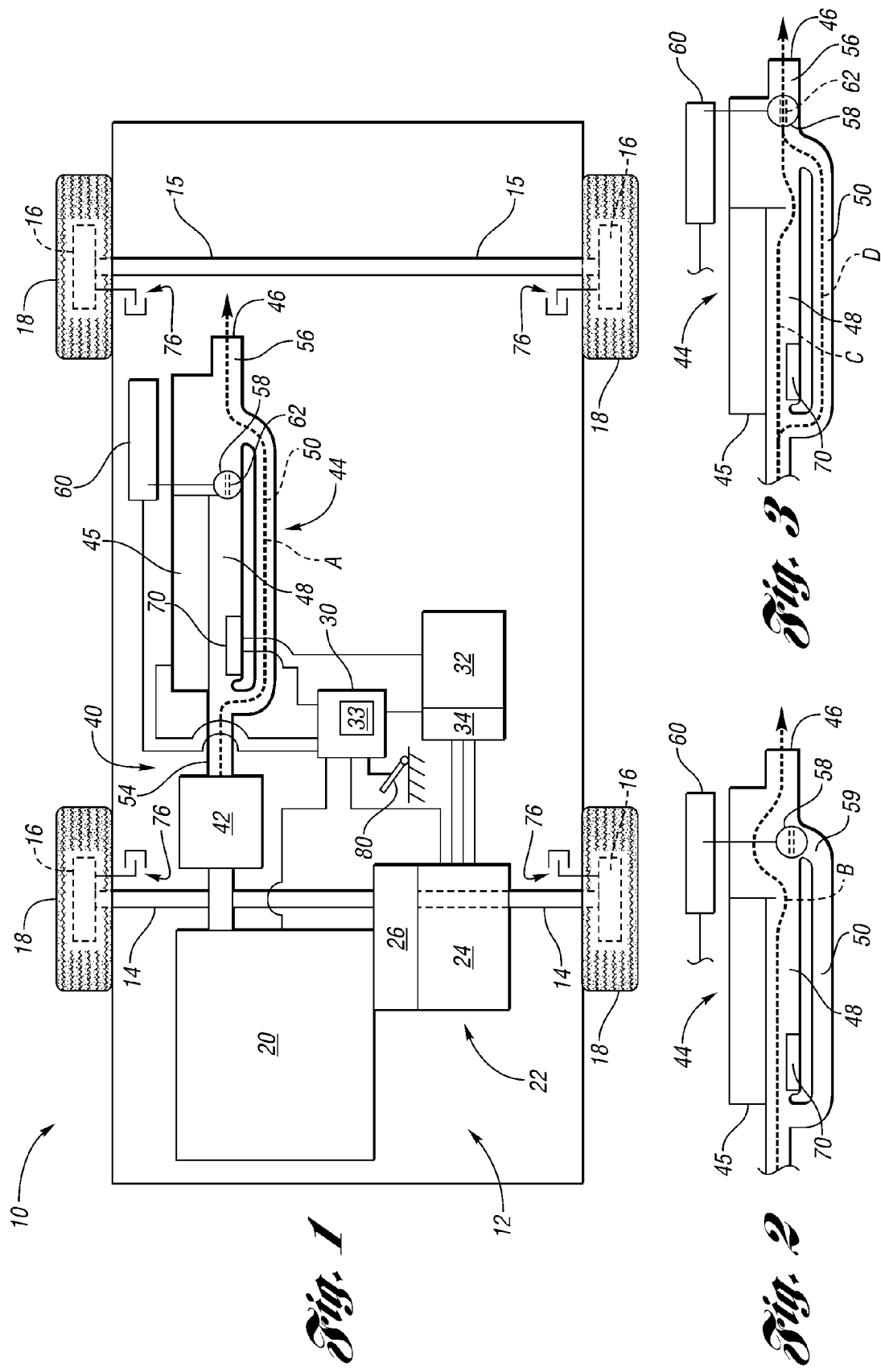

HYBRID VEHICLE AND METHOD OF BRAKING BY CONTROLLING AN EXHAUST HEAT RECOVERY DEVICE BYPASS VALVE ON A HYBRID VEHICLE

TECHNICAL FIELD

The present teachings generally include a hybrid vehicle and method of braking

BACKGROUND

Hybrid vehicles that have an electric motor-generator are often configured to implement regenerative braking to slow the vehicle by operating the motor-generator as a generator. The motor-generator converts rotational torque of the vehicle axle into electrical energy stored in an energy storage device, such as a battery. The availability of regenerative braking is variable as it depends upon the charge power limit of the energy storage device. For example, if the charge power limit of the energy storage device is less than the required braking power, then regenerative braking will not be able to provide all of the desired braking power, and the friction brakes of the vehicle will be required to absorb at least some energy. If, during a braking event, the energy storage device reaches a predetermined maximum state of charge, the regenerative braking is ceased and the system must increase the level of friction braking to meet the braking demand. Although suitable for meeting the level of braking demand, these systems can have an uneven feel when such a transition from regenerative to full friction braking occurs. Additionally, because the availability of the second form of braking (i.e., the regenerative braking) is variable, the friction braking system must be able to bear a substantial amount of load, adding cost to the system. For example, an additional hydraulic pump is often required on such braking systems to increase the braking capacity.

Some vehicles have a dedicated exhaust valve in the exhaust system that can be moved to restrict exhaust flow, adding torque on the engine to slow the engine, providing an additional source of braking power. The dedicated exhaust valve is used only for this purpose on such vehicles, adding expense to the vehicle.

SUMMARY

A method is provided for braking a hybrid vehicle that has a powertrain with an engine and that has an exhaust system including an exhaust heat recovery device. The method includes determining via a controller a desired braking power for braking the vehicle. The method further includes moving a bypass valve that controls exhaust gas flow through the exhaust heat recovery device to a relatively restrictive position to provide at least some of the desired braking power, compressed exhaust gas thereby causing increased torque on the engine to provide at least some of the desired braking power. The powertrain may include a motor-generator, and the method may further include determining via the controller a charge power limit of an energy storage device for a hybrid transmission of the powertrain. Under the method, the motor-generator can be controlled to function as a generator so that at least some of the desired braking power is provided by regenerative braking. Moving the bypass valve to the relatively restrictive position is carried out only if the desired braking power is greater than the charge power limit. The engine can also be controlled under the method to consume power to provide at least some of the desired braking power when the desired braking power is greater than the charge power limit.

Under the method, the bypass valve is also used for its traditional purpose, i.e., to regulate exhaust flow to control heat extracted for engine warming. Accordingly, under the method, the bypass valve can also be moved via the controller to close a bypass passage when the engine has a temperature less than a predetermined engine temperature and/or a rotational speed less than a predetermined speed. Movement of the bypass valve for this purpose is not done in order to assist vehicle braking; rather, closing the bypass passage forces exhaust flow through a heat transfer passage which increases the rate of thermal heat exchange to warm the engine.

Accordingly, under the method, an existing component, the bypass valve, is controlled to serve an additional function, adding a third source of braking power in addition to first and second sources of braking, friction braking mechanisms and regenerative braking. The ability of the powertrain to meet braking demands is thus less variable than in systems in which regenerative braking via the motor-generator is the only source of powertrain braking. The availability of regenerative braking is variable as it is dependent on the conditions of the energy storage device. Because of the availability of the exhaust system as a power sink, the friction braking system can thus be simpler and less expensive. For example, an additional hydraulic pump to increase the braking ability of the friction braking mechanisms would not be required.

The above features and advantages and other features and advantages of the present teachings are readily apparent from the following detailed description of the best modes for carrying out the present teachings when taken in connection with the accompanying drawings.

BRIEF DESCRIPTION OF THE DRAWINGS

FIG. 1 is a schematic illustration of a hybrid vehicle with a controller configured to execute a method of controlling an exhaust heat recovery device, and showing an exhaust heat recovery device bypass valve in a first position.

FIG. 2 is a schematic fragmentary illustration of a portion of the vehicle of FIG. 1, showing the bypass valve in a second position.

FIG. 3 is a schematic fragmentary illustration of a portion of the vehicle of FIG. 1, showing the bypass valve in a third position.

DETAILED DESCRIPTION

Figure 4:
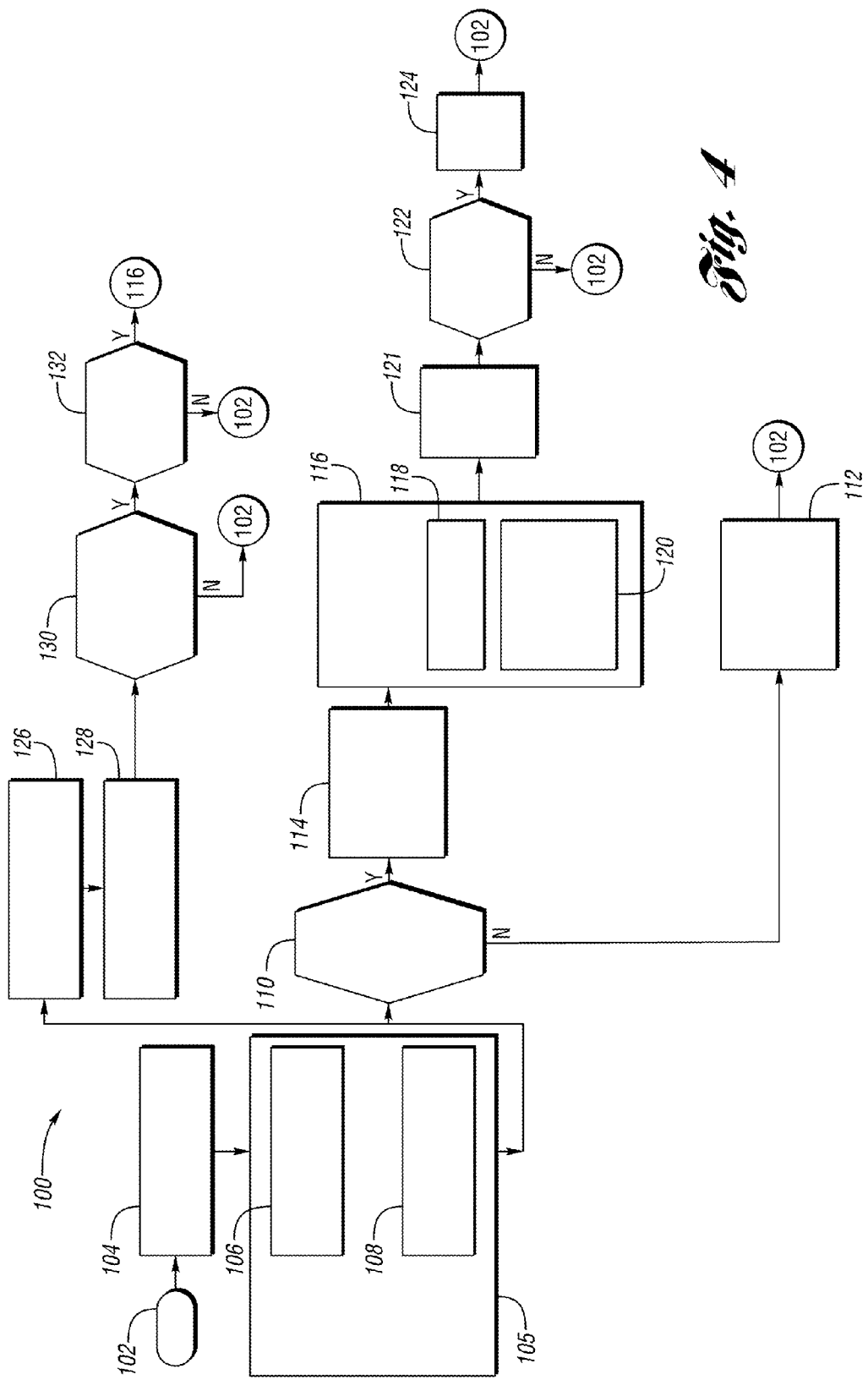
FIG. 4 is a flow diagram of the method of controlling the exhaust heat recovery device of FIG. 1.

Referring to the drawings, wherein like reference numbers refer to like components, FIG. 1 shows a hybrid vehicle 10 that has a hybrid powertrain 12 configured to provide tractive torque to a vehicle axle 14, The vehicle axle 14 has wheels 16 mounted on the axle 14 to rotate with the axle 14. Tires 18 are mounted on the wheels 16. The powertrain 12 thus provides torque to propel the vehicle 10. The axle 14 is in two portions connected via a differential included in the gearing arrangement 26. As depicted, the axle 14 is a front axle of the vehicle 10. The vehicle 10 also has an axle 15 that serves as the rear axle. The axle 15 also has wheels 16 mounted for rotation thereon and tires 18 mounted to the wheels 16. Although the powertrain 12 is shown mechanically driving only the front axle 14, additional gearing could continuously or selectively connect the powertrain 12 to the rear axle 15 to provide all wheel-drive functionality. The axles 14, 15 are shown only schematically.

The powertrain 12 includes an engine 20 and a hybrid transmission 22. The engine 20 can be a spark-ignition combustion engine or a diesel compression-ignition combustion engine. The hybrid transmission 22 includes an electric motor-generator 24 and a gearing arrangement 26. The engine 20 and the motor-generator 24 are both connected to different members of the gearing arrangement 26, and the gearing arrangement is operatively connected to the axle 14 so that power from either or both of the engine 20 and the motor-generator 24 can be provided to the axle 14, depending on the operating mode of the powertrain 12, as will be readily understood by those skilled in the art. Although only one motor-generator 24 is depicted, one or more additional motor-generators may be included in the powertrain 12.

The motor-generator 24 can be controlled by a controller 30 to function as a motor or as a generator. Specifically, the controller 30 sends a control signal to a motor controller power inverter module 34 that enables stored electrical energy in an energy storage device 32, such as a battery, to be converted to current that powers the motor-generator 24 to function as a motor. The controller 30 can also send a control signal to the energy storage device 32 that enables the motor controller power inverter module 34 to convert alternating current provided by the motor-generator 24 into direct current to be stored in the energy storage device 32 when the motor-generator 24 is controlled to function as a generator, converting torque from the gearing arrangement 26 into electrical power. Although described herein as a battery and an electric motor-generator requiring alternating current, other types of energy storage devices and motor-generators can be used in a hybrid vehicle and under the method 100 described herein.

The engine 20 has an exhaust system 40 that treats exhaust flowing from combustion chambers in the engine 20. The exhaust system 40 can include a catalytic converter 42 and an exhaust heat recovery device (EHRD) 44 downstream of the catalytic converter 42 in the flow of exhaust gas from the engine 20 to an exit 46 of the exhaust system 40. The exhaust system 40 can include additional exhaust gas treatment components, as appropriate for exhaust gas treatment for internal combustion or diesel engines.

The EHRD 44 includes an exhaust heat recovery device heat exchanger (EHRDHE) 45. A plurality of coolant flow passages (not shown) are in fluid communication with engine oil within the engine, and with the exhaust heat in the EHRDHE 45. The EHRD 44 has a heat transfer passage 48 and a bypass passage 50 between an inlet 54 and an outlet 56 of the EHRD 44. The heat transfer passage 48 is in fluid communication with the EHRDHE 45. The bypass passage 50 is not in fluid communication with the EHRDHE 45. Thus, when exhaust gas travels through the heat transfer passage 48, heat can be extracted for heat exchange with the engine oil, whereas heat cannot be extracted from exhaust gas traveling through the bypass passage 50.

The exhaust system 40 includes a bypass valve 58 with a stopper movable by an actuator 60 that is controlled by the controller 30. Exhaust gas flow through the exhaust system 44 is determined by the position of the bypass valve 58 under the control of the controller 30 according to an algorithm stored on a processor 33 as described herein. The stopper of the bypass valve 58 can be moved between a first position shown in FIG. 1, a second position shown in FIG. 2, and an optional third position shown in FIG. 3.

In the first position, the stopper of the bypass valve 58 substantially blocks flow through the heat transfer passage 48. As used herein, "substantially blocks flow", "substantially prevents flow", or "substantially closes" means more than half of the flow is blocked. Thus, when the valve 58 is in the first position of FIG. 1, the vast majority of exhaust gas flow is through the bypass passage 50, accordingly to flow arrow A. The stopper of the bypass valve 58 has a small orifice 62 that allows some exhaust gas to flow through the bypass valve 58 regardless of the position of the bypass valve 58. Thus, a very small amount of exhaust gas flow may still occur through the heat transfer passage 48 when the bypass valve 58 is in the first position. However, the orifice 62 is sized so that flow through the orifice 62 is very restrictive.

In the second position of FIG. 2, the stopper of the bypass valve 58 substantially blocks an outlet 59 of the bypass passage 50, so that the vast majority of flow is through the heat transfer passage 48 according to flow arrow B. Flow through the heat transfer passage 48 passes the EHRDHE 45 which contains multiple coils (not shown) carrying the coolant between the EHRD 44 and the engine 20. Flow through the heat transfer passage 48 is thus more restricted than flow through the bypass passage 50. The second position of the bypass valve 58 in FIG. 2 is thus considered to be a more restrictive position than the first position of the bypass valve 58 in FIG. 1.

In some embodiments, the controller 30 can control the actuator 60 to move the bypass valve 58 to a third position of FIG. 3 that is more restrictive than both the first position and the second position. In the third position, the stopper of the bypass valve 58 substantially blocks the outlet 56 of the EHRD 44. Exhaust gas can flow through either the heat transfer passage 48 (flow arrow C) or the bypass passage 50 (flow arrow D) but the flow is severely restricted, as flow to the outlet 46 of the exhaust system 40 is forced through the orifice 62 of the bypass valve 58. Because both the second position and the third position of the bypass valve 58 are more restrictive with respect to exhaust gas flow than the first position, exhaust gas flowing in the exhaust system 40 becomes more compressed by the engine when the bypass valve 58 is in the second or the third position.

In some embodiments, the exhaust system 40 can also include a thermo-electric converter 70 that is capable of converting converting heat energy into electrical energy, under the control of the controller 30. The thermo-electric converter 70 is connected to the energy storage device 32 by a transfer conductor, such as electrical wire or cable, so that heat of the exhaust gas can be converted to electrical energy in the energy storage device 32.

Friction brake mechanisms 76 are operatively connected to each of the wheels 16. The friction brake mechanisms 76 are operatively connected to the controller 30 and can receive a control signal from the controller 30 to be applied, i.e., to engage, thereby providing braking torque on the axle 14 or 16 to slow the vehicle 10. The operative connection of the friction brake mechanisms 76 to the controller 30 is not shown for purposes of clarity in the drawings but may be via transfer conductors and electrically actuated hydraulic valves. A vehicle operator can demand braking by actuating a braking input mechanism, such as by depressing a brake pedal 80. For example, the controller 30 is operatively connected to the brake pedal 80 and can determine an amount of requested braking power based on a braking signal provided to the controller 30. The braking signal can be proportionate to the angle of depression of the brake pedal 80.

The controller 30 executes a stored algorithm on the processor 33 to control operation of the hybrid powertrain 12 and the exhaust system 40 to establish desired operating modes of the powertrain 12 (e.g., engine only, hybrid modes, and electric-only operating modes), by controlling the engine 20 to be off or on and the motor-generator to function as a motor or as a generator, as is known. Moreover, the controller 30 executes a stored algorithm to operate the catalytic converter 42 and other exhaust system components to control emissions levels in the exhaust gas, and to move the bypass valve 58 to establish desired heat recovery for warming the engine 20.

The controller 30 executes the stored algorithm on the processor 33 to provide braking of the hybrid vehicle 10. The stored algorithm is depicted in the flowchart of FIG. 4 as a method 100 of braking the hybrid vehicle 10. As described herein, different sources of braking power are available under the method 100, as the engine 20, the exhaust system 40, the motor-generator 24, and the friction brake mechanisms 76 can be implemented alone or in different combinations to provide braking power. Use of the motor-generator 24 to provide regenerative braking power is given priority under the method 100 due to its associated fuel economy benefits. However, under certain operating parameters, use of the motor-generator 24 as a generator may not be suitable. The availability of the exhaust system 40 as another source of braking power means that less braking power is required from the friction braking mechanisms 76, enabling the use of less complex and less expensive friction braking mechanisms 76 and providing a smoother braking feel, as described herein.

Specifically, referring to FIG. 4, the method 100 begins at the start 102 and implements step 104, determining a desired braking power when the controller 30 receives a braking signal such as due to depression of the brake pedal 80. The braking signal can indicate the angle of depression of the brake pedal 80, and the desired braking power can be a linear function of the angle of depression. For purposes of example only, the first 5 percent of brake pedal travel (e.g., depression by 0 to 2 degrees of a brake pedal 80 that can travel over a 45 degree range) may not cause a braking signal in order to filter out habitual resting on the brake pedal without intending braking. The next 15 percent of brake pedal 80 travel may then cause a braking signal that indicates a first amount of braking power is required to be provided by the powertrain 12. The remaining 80 percent of travel of the brake pedal 80 may cause a braking signal that indicates a second amount of braking power must be provided by the friction braking mechanisms 76 in addition to the amount of braking power that is provided by the powertrain 12.

Thus, under step 104, the controller 30 can determine both a total desired braking power, and the amount of the total desired braking power that is to be provided by the hybrid powertrain 12. The controller 30 must then determine if any portion of the braking power to be provided by the powertrain 12 will be provided by the motor-generator 24 functioning as a generator to provide regenerative braking power, and if any portion must come from the exhaust system 40, and if any portion must come from the engine 20 consuming power.

In order to make this determination, the controller 30 first considers multiple operating parameters. Accordingly, if a desired nonzero braking power is determined in step 104, then the method 100 moves to step 105 to determine a charge power limit of the energy storage device 32. The charge power limit can be referred to as a battery charge power limit. The battery charge power limit is the amount of power that the controller 30 determines that the energy storage device 32 should accept based on operating conditions at the time the determination is made. The battery charge power limit can be based in part on a state of charge of the energy storage device 32 in comparison to a predetermined maximum state of charge of the energy storage device 32, and a temperature of the energy storage device 32, which affects the charge rate of the energy storage device 32, and can determine whether the energy storage device 32 can charge fast enough to provide the desired powertrain braking power. Thus, step 105 can include step 106, determining a state of charge of the energy storage device 32, and step 108, determining a temperature of the energy storage device 32. The state of charge can be based on sensor signals provided by a voltage sensor, and the temperature can be based on sensor signals provided by a temperature sensor. The sensors are not shown in FIG. 1, but are readily understood by those skilled in the art.

The battery charge power limit determined by the controller 30 can be decreasing as the state of charge of the energy storage device 32 increases and approaches the predetermined maximum state of charge. For example, not considering temperature, the battery charge power limit may be 40 kilowatts (kW) at 60% state of charge. The controller 30 may keep the 40 kW charge power limit in place, until the energy storage device 32 reaches a higher state of charge, such as 70% state of charge. At that point, the controller 30 may start ramping down the charge power limit, from 40 kW at 70% state of charge to 0 kW prior to the energy storage device 32 reaching 90% state of charge, which can be the predetermined maximum state of charge. Other factors can also affect the charge power limit. For example, the charge power limit determined in step 105 can also account for any increase in state of charge of the energy storage device 32 that is to be provided by the thermo-electric converter 70 converting waste heat in the exhaust to electrical energy in the energy storage device 32.

The method 100 then proceeds to step 110 to compare the desired braking power determined in step 104 to the battery charge power limit determined in step 105. For purposes of this comparison, the power of each step 104, 105 must be computed in the same terms, such as mechanical power. In that case, the battery charge power limit is quantified in terms of the equivalent regenerative braking mechanical power provided to the vehicle axle 14 if power in the amount of the battery charge power limit is provide to the energy storage device 32.

If the desired braking power is not greater than the battery power charge limit in step 110, then all braking power can be provided by regenerative braking, and the method 100 proceeds to step 112 and controls the motor-generator 24 to function as a generator, adding torque to the axle 14 that opposes the direction of vehicle travel, thereby providing at least some of the desired braking power. Regenerative braking is favored over braking by the exhaust system 40 under these operating parameters of the energy storage device 32, because the energy stored via regenerative braking can be reused during subsequent vehicle operation when the motor-generator 24 functions as a motor. In the flowchart of FIG. 4, a "Y" indicates a positive determination, and an "N" indicates a negative determination of a method step. Furthermore, the flowchart is for purposes of example only, and at least some of the steps can be performed in a different order than shown.

If it is determined in step 110 that the desired braking power is greater than the battery charge power limit, then regenerative braking via the motor-generator 24 alone is unable to provide all of the desired braking power. Accordingly, at least some of the desired braking power must be provide by other means. The method 100 first proceeds to step 114, in which the controller 30 controls the motor-generator 24 to function as a generator to provide an amount of braking power approaching the battery charge power limit determined in step 105. Thus, the first priority under the method 100 is to ensure that regenerative braking power is provided if possible.

Next, because regenerative braking power alone cannot satisfy the desired braking power in this case, the method 100 proceeds to step 116 in which the controller 30 sends a control signal to the actuator 60 to move the bypass valve 58 to a relatively restrictive position. The relatively restrictive position can be the second position of FIG. 2, in which case step 116 includes sub step 118, closing the bypass passage 50. For example, for a bypass valve that has only two positions, the relatively restrictive position will necessarily be the second position of FIG. 2, as forcing exhaust gas flow through the heat transfer passage 48 provides more compression than when exhaust gas can flow through the bypass passage 50. Because the bypass valve 58 has three positions, the relatively restrictive position could be the second position, achieved under sub step 118, at least substantially closing the bypass passage 50, or the third position of FIG. 3, achieved under sub step 120, at least substantially closing both the bypass passage 50 and the heat transfer passage 48. The third position is the most restrictive position, providing the greatest compression of the exhaust gas and associated torque load on the engine 20.

Next, the method 100 proceeds to step 121, in which the controller 30 directly, or by communication with a separate engine controller, controls the engine 20 to consume power. This can be accomplished by opening an engine throttle, if the engine 20 has a throttle, and/or by raising the engine speed by down-shifting the transmission 22, to consume more power. When the throttle is opened, pressure inside the engine 20 increases. If the transmission 22 is shifted to a "lower gear" (i.e., a gear with a higher numerical ratio) then the engine 20 has a greater gear ratio leverage over an output member of the powertrain 12.

After the hybrid powertrain 12 is controlled to provide braking power according to steps 110, 114 and 116, the method 100 proceeds to step 122, to determine whether additional braking power is needed to satisfy the desired braking power of step 104. That is, if desired braking power as established by the position of the braking pedal 80 is greater than can be provided by the sources of braking power (i.e., the motor-generator 24, the engine 20, and the exhaust system 40) in the hybrid powertrain 12 alone, then the method 100 proceeds to step 124, in which the controller 30 sends control signals to brake actuators that apply the friction braking mechanisms 76 to provide the additional desired braking power by friction braking, applying torque to the vehicle wheels 16.

The bypass valve 58 is movable to provide the braking functionality of the exhaust system 40 as described above, and can also be controlled to affect exhaust gas heating as well. The position of the bypass valve 58 dictated by optimal heat exchange with the engine coolant can be implemented during periods when braking power is not required from the hybrid powertrain 12. Thus, under predetermined operating parameters of the engine 20, the bypass valve 58 will be in the second position of FIG. 2 to close the bypass passage 50 while allowing exhaust gas to flow through the heat transfer passage 48 to affect heat exchange with the engine coolant via the EHRDHE 45. Specifically, under the method 100, the controller 30 determines the temperature of the engine 20, as referenced by the engine coolant temperature in step 126. In step 128, the controller 30 determines the speed of the engine 20, as referenced by a commanded speed necessary to satisfy operator acceleration and speed requirements based on the position of an accelerator input, such as an accelerator pedal (not shown).

In step 130, the controller 30 then compares the engine temperature to a predetermined engine temperature, such as by determining whether the engine temperature is less than the predetermined engine temperature. If the engine temperature is not less than the predetermined temperature, then the method 100 returns to the start 102. However, if the engine temperature is less than the predetermined engine temperature, then the method 100 can proceed directly to step 116 or can instead first proceed to step 132 to compare the engine speed to a predetermined engine speed such as by determining whether the engine speed is less than the predetermined engine speed. If the engine speed is not less than the predetermined engine speed, then heating of the engine coolant is not warranted under the method 100, and the method 100 returns to the start 102. However, if the engine speed is less than the predetermined engine speed, then the method 100 proceeds to step 116 and moves the bypass valve 58 to the second position of FIG. 3 via sub step 118 to close the bypass passage 50, thereby allowing exhaust heat to warm the engine coolant via the EHRD 45.

The vehicle 10 and the method 100 thus enable the use of a component existing on many vehicles (the bypass valve 58) to provide additional braking functionality from the hybrid powertrain 12, enabling the use of simpler and less costly friction braking mechanisms in hybrid vehicles.

While the best modes for carrying out the many aspects of the present teachings have been described in detail, those familiar with the art to which these teachings relate will recognize various alternative aspects for practicing the present teachings that are within the scope of the appended claims.

The invention claimed is:

1. A method of braking a hybrid vehicle that has a powertrain with an engine and that has an exhaust system including an exhaust heat recovery device, the method comprising:
   determining via a controller a desired braking power for braking the vehicle;
   moving a bypass valve that controls exhaust gas flow through the exhaust heat recovery device to a relatively restrictive position to provide at least some of the desired braking power, compressed exhaust gas thereby causing increased torque on the engine to provide at least some of the desired braking power;
   wherein the exhaust heat recovery device has an inlet and an outlet, wherein the exhaust heat recovery device has a heat transfer passage and a bypass passage through which exhaust gas selectively flows between the inlet and the outlet;
   wherein the bypass valve has a first position that permits exhaust gas flow through the bypass passage and substantially prevents exhaust gas flow through the heat transfer passage;
   wherein the bypass valve has a second position that substantially prevents exhaust gas flow through the bypass passage and permits exhaust gas flow through the heat transfer passage;
   wherein the bypass valve has a third position that substantially prevents exhaust gas flow through both the bypass passage and the heat transfer passage;
   wherein said moving the bypass valve to the relatively restrictive position is moving the bypass valve from either the first position or the second position to the third position; and
   controlling the engine to at least one of open an engine throttle or raise engine speed, to thereby consume power when the desired braking power is greater than the charge power limit.

2. The method of claim 1, wherein the powertrain includes a motor-generator, and further comprising:

determining via the controller a charge power limit of an energy storage device for a hybrid transmission of the powertrain;

controlling the motor-generator to function as a generator so that at least some of the desired braking power is provided by regenerative braking; and wherein said moving the bypass valve to the relatively restrictive position is only if the desired braking power is greater than the charge power limit.

3. The method of claim 2, wherein the charge power limit is at least partially based on a state of charge of the energy storage device and a predetermined maximum state of charge of the energy storage device.

4. The method of claim 2, wherein the charge power limit is at least partially based on a temperature of the energy storage device.

5. The method of claim 1, further comprising:

determining via the controller whether a temperature of the engine is below a predetermined temperature; and moving the bypass valve to substantially close the bypass passage if the temperature of the engine is below the predetermined temperature.

6. The method of claim 1, further comprising:

determining via the controller whether a temperature of the engine is below a predetermined temperature and whether a speed of the engine is below a predetermined speed; and moving the bypass valve to substantially close the bypass passage if the temperature of the engine is below the predetermined temperature, and the speed of the engine is below the predetermined speed.

7. The method of claim 1, further comprising:

applying friction brake mechanisms operatively connected to vehicle wheels to slow the vehicle, at least some of the desired braking power thereby being provided by friction braking.

8. The method of claim 1, wherein the vehicle includes a thermo-electric converter that is in fluid communication with the exhaust gas and that converts heat energy of the exhaust gas to electrical energy stored in an energy storage device.

9. A method of braking a hybrid vehicle that has a powertrain with an engine and that has an exhaust system including an exhaust heat recovery device, wherein the powertrain includes a motor-generator operatively connected to wheels of the vehicle, the method comprising:

determining via a controller a desired braking power for braking the vehicle;

determining via the controller a charge power limit of the energy storage device;

comparing via the controller the desired braking power to the charge power limit;

controlling a motor-generator to function as a generator, at least some of the desired braking power thereby being provided by regenerative braking;

moving a bypass valve that controls exhaust gas flow through the exhaust heat recovery device to a relatively restrictive position if the desired braking power is greater than the charge power limit, compressed exhaust gas thereby causing increased torque on the engine to provide at least some of the desired braking power;

wherein the exhaust heat recovery device has an inlet and an outlet, wherein the exhaust heat recovery device has a heat transfer passage and a bypass passage through which exhaust gas selectively flows between the inlet and the outlet;

wherein the bypass valve has a first position that permits exhaust gas flow through the bypass passage and substantially prevents exhaust gas flow through the heat transfer passage;

wherein the bypass valve has a second position that substantially prevents exhaust gas flow through the bypass passage and permits exhaust gas flow through the heat transfer passage;

wherein the bypass valve has a third position that substantially prevents exhaust gas flow through both the bypass passage and the heat transfer passage; and wherein said moving the bypass valve from the first position to the relatively restrictive position is moving the bypass valve from the first position to the second position or the third position, or moving the bypass valve from the second position to the third position.

10. The method of claim 9, further comprising:

controlling the engine to consume power to provide at least some of the desired braking power when the desired braking power is greater than the charge power limit.

11. The method of claim 9, further comprising:

determining via the controller whether a temperature of the engine is below a predetermined engine temperature and whether a speed of the engine is below a predetermined speed; and moving the bypass valve to substantially close the bypass passage when the temperature of the engine is below the predetermined engine temperature and the speed of the engine is below the predetermined speed.

12. The method of claim 9, further comprising:

applying friction brake mechanisms operatively connected to vehicle wheels to slow the vehicle, at least some of the desired braking power thereby being provided by friction braking.

13. The method of claim 9, wherein the vehicle includes a thermo-electric converter that is in fluid communication with the exhaust gas and that converts heat energy of the exhaust gas to electrical energy stored in an energy storage device.

14. A hybrid vehicle comprising:

a vehicle axle and wheels mounted on the axle to rotate with the axle;

a hybrid powertrain including an engine, a motor-generator, and an energy storage device operatively connected to the motor-generator; wherein the hybrid powertrain is operatively connected to the vehicle axle and configured to provide torque to the vehicle axle to propel the vehicle;

friction brake mechanisms operatively connected to the vehicle wheels for slowing rotation of the wheels;

an exhaust system in fluid communication with exhaust gas flowing from the engine; wherein the exhaust system includes:

an exhaust heat recovery device that has an inlet and an outlet, a heat transfer passage and a bypass passage through which exhaust gas selectively flows between the inlet and the outlet;

a movable bypass valve that controls exhaust gas flow through the exhaust heat recovery device; wherein the bypass valve has a first position that permits exhaust gas flow through the bypass passage and substantially prevents exhaust gas flow through the heat transfer passage; wherein the bypass valve has a second position that substantially prevents exhaust gas flow through the bypass passage and permits exhaust gas flow through the heat transfer passage thereby causing exhaust gas to compress in the exhaust system and increasing torque on the engine; wherein the bypass valve has a third position that substantially prevents exhaust gas flow through both the bypass passage and the heat transfer passage; and a controller having a processor that executes a stored algorithm that:
  (i) determines a desired vehicle braking power;
  (ii) determines a charge power limit of the energy storage device;
  (iii) controls the motor-generator to function as a generator to convert torque at the vehicle wheels into electrical energy stored in the energy storage device by regenerative braking if the desired vehicle braking power is nonzero and the state of charge of the energy storage device is less than a predetermined state of charge; and
  (iv) moves the bypass valve to either one of the second position or the third position if the desired vehicle braking power is greater than the charge power limit.

15. The hybrid vehicle of claim 14, further comprising:
controlling the engine to consume power to provide at least some of the desired braking power when the desired braking power is greater than the charge power limit.

16. The hybrid vehicle of claim 15, wherein said controlling the engine to consume power is at least one of opening a throttle of the engine or raising engine speed.

* * * * *